(12) United States Patent
Brottlund et al.

(10) Patent No.: US 9,072,388 B1
(45) Date of Patent: Jul. 7, 2015

(54) BEDDING FOUNDATION HAVING NESTABLY STACKABLE SPRING ASSEMBLY HAVING REDUCED SWAY

(71) Applicant: L&P Property Management Company, South Gate, CA (US)

(72) Inventors: Von W. Brottlund, Pierce City, MO (US); John E. Hull, Monett, MO (US); Darrell A. Richmond, Carthage, MO (US)

(73) Assignee: L&P Property Management Company, South Gate, CA (US)

( * ) Notice: Subject to any disclaimer, the term of this patent is extended or adjusted under 35 U.S.C. 154(b) by 9 days.

(21) Appl. No.: 14/151,947

(22) Filed: Jan. 10, 2014

(51) Int. Cl.
*A47C 23/043* (2006.01)
*A47C 23/02* (2006.01)
*F16F 3/02* (2006.01)
*A47C 23/16* (2006.01)

(52) U.S. Cl.
CPC ............ *A47C 23/0436* (2013.01); *A47C 23/02* (2013.01); *F16F 3/023* (2013.01); *A47C 23/0438* (2013.01); *A47C 23/16* (2013.01)

(58) Field of Classification Search
CPC ...... A47C 23/00; A47C 23/05; A47C 23/007; A47C 23/04; A47C 23/0438; A47C 23/12; A47C 23/14; A47C 23/145; A47C 23/125; A47C 23/15; A47C 23/155; A47C 23/16; A47C 23/26; A47C 23/30; A47C 27/065; A47C 27/066; A47C 27/067; A47C 27/068
USPC .......... 5/247, 253, 254, 255, 259.1, 260, 266
See application file for complete search history.

(56) References Cited

U.S. PATENT DOCUMENTS

| | | | |
|---|---|---|---|
| 3,391,412 A * | 7/1968 | Bronstien, Jr. et al. | ........... 5/260 |
| 3,660,854 A | 5/1972 | Garceau | |
| 3,756,167 A * | 9/1973 | Wilson | ........ 108/57.14 |
| 4,377,279 A | 3/1983 | Schulz, Jr. et al. | |
| 5,052,064 A | 10/1991 | Hagemeister et al. | |
| 5,346,188 A | 9/1994 | Rodgers et al. | |
| 5,361,434 A | 11/1994 | Hagemeister et al. | |
| 5,418,989 A * | 5/1995 | Roe | .................... 5/719 |
| 5,497,979 A * | 3/1996 | Schulz et al. | ................. 267/103 |
| 5,562,274 A | 10/1996 | Kitchen et al. | |
| 5,704,595 A | 1/1998 | Kitchen et al. | |
| 6,170,915 B1 | 1/2001 | Weisz | |
| 6,484,339 B2 | 11/2002 | Mossbeck et al. | |
| 6,493,887 B1 * | 12/2002 | DeFranks et al. | ................. 5/254 |
| 7,237,282 B2 | 7/2007 | Beck et al. | |
| 7,360,263 B2 | 4/2008 | McCraw | |
| 7,469,431 B2 | 12/2008 | Mauro et al. | |
| 7,546,647 B1 | 6/2009 | McCraw | |
| 7,805,780 B2 | 10/2010 | Davis et al. | |

(Continued)

*Primary Examiner* — Nicholas Polito
*Assistant Examiner* — David R Hare
(74) *Attorney, Agent, or Firm* — Wood, Herron & Evans, LLP (57) ABSTRACT

A bedding foundation having a nestably stackable spring assembly, including a border wire. The foundation's spring assembly may be nestably stacked with numerous other such assemblies for transportation, thereby avoiding the need to compress and tie the assembly for shipping. Each spring assembly includes support wires having alternating peaks and valleys along with stabilizer wires having alternating peaks and valleys. The valleys of the stabilizer wires are secured to the valleys of the support wires. The peaks of the stabilizer wires are secured to longitudinal wires extending parallel the sides of the border wire.

23 Claims, 10 Drawing Sheets

(56) References Cited

U.S. PATENT DOCUMENTS

| | | | |
|---|---|---|---|
| 7,930,777 B2 | 4/2011 | Davis et al. | |
| 8,327,475 B2 * | 12/2012 | Haffner et al. | 5/260 |
| 8,332,974 B2 | 12/2012 | Haffner et al. | |
| 2008/0163423 A1 * | 7/2008 | Clark et al. | 5/247 |
| 2012/0255119 A1 * | 10/2012 | Brottlund et al. | 5/247 |

\* cited by examiner

BEDDING FOUNDATION HAVING NESTABLY STACKABLE SPRING ASSEMBLY HAVING REDUCED SWAY

BACKGROUND OF THE INVENTION

This invention relates generally to bedding and, more particularly, to a bedding foundation having a nestably stackable spring assembly.

Bedding foundations, or so-called box springs, generally include a base and an upper grid including a generally rectangular border wire between which coil or bent wire spring modules are located. As thus manufactured, these box spring assemblies are bulky and shipping them to a bedding manufacturer for application of padding and covering thereto is costly because of space requirements. To reduce the space requirements, it is customary to compress the assemblies to reduce their individual thicknesses and to tie them in their compressed state. This involves using presses and ties which are expensive, and the extra operations of pressing and tying the assemblies also add to their manufacturing cost. At the delivery end, the manufacturer must cut and discard the ties before applying the covering. These additional material and handling expenses increase the end cost of box spring assemblies.

Box spring assemblies by their very nature are intended to provide a stable support foundation for mattresses or other bedding placed on top thereof. Toward that end, the components used in the box spring assemblies should be securely and firmly mounted in the assembly to avoid any wobble, sway or shifting during use.

U.S. Pat. Nos. 5,052,064 and 7,237,282 disclose bedding foundations having nestably stackable spring assemblies having an upper border wire having a round cross-sectional configuration. U.S. Pat. Nos. 8,327,475 and 8,332,974 disclose bedding foundations having nestably stackable spring assemblies which include a border wire having a rectangular cross-sectional configuration.

In order to further increase the stability of the foundation, it would be desirable to increase the stability of the nestably stackable spring assembly of a bedding foundation by including additional wires in the assembly.

Therefore, a bedding foundation having a nestable, stackable spring assembly, including a plurality of stabilizer wires that can be stacked for shipping without having to compress and tie the spring assembly, would be a significant improvement.

SUMMARY OF THE INVENTION

This invention provides the desirable stability without compromising the integrity of known bedding foundations. In one embodiment, this invention is a bedding foundation having a nestably stackable spring assembly which may be shipped separately from the bases of the foundations. This bedding foundation comprises a rectangular base and a spring assembly fixedly attached atop the base. Padding overlies the spring assembly and a fabric covering surrounds the spring assembly, padding and base.

The nestable stackable spring assembly includes a rectangular border wire having two parallel sides and two parallel ends. The border wire may have a generally rectangular cross-sectional configuration with the height being greater than the width of the cross-section. Alternatively, the border wire may have another cross-sectional configuration such as a conventional round cross-sectional configuration. The spring assembly further comprises a plurality of spaced and longitudinally extending support wires parallel to the border wire sides and extending between the border wire ends and being secured thereto. Each support wire has ends which may be welded or otherwise secured to the border wire ends and is a continuous piece of wire. These support wires are generally corrugated along their lengths, having a plurality of flattened peaks and a plurality of flattened valleys. The flattened peaks are generally co-planar with the plane defined by the border wire, and the flattened valleys are displaced beneath and intermediate of the peaks.

The spring assembly further comprises longitudinally spaced, parallel and transversely extending upper connector wires parallel to the border wire ends and having ends welded or otherwise secured to the border wire sides. The upper connector wires are further secured, including by welds, along their lengths to the flattened peaks of the support wires.

The spring assembly may further comprise a plurality of transversely spaced, parallel and longitudinally extending continuous longitudinal wires welded or otherwise secured to the upper connector wires and having ends welded or otherwise secured to the border wire ends and extending parallel the border wire sides.

The longitudinal voids between the peaks of the support wires are of a greater dimension than the valleys of the support wires. This configuration enables one spring assembly to be nestably stacked atop a second spring assembly since the support wire valleys of the first assembly fit into the voids between the peaks of the support wires of the second assembly. Such a nested and stacked arrangement results in a total height dimension which is less than the sum of the individual assembly height dimensions.

The spring assembly further comprises longitudinally spaced, parallel and transversely extending stabilizer wires parallel to the border wire ends. Each of the stabilizer wires is a continuous piece of wire having a plurality of flattened peaks and a plurality of flattened valleys, the flattened peaks being welded or otherwise secured to the longitudinal wires of the upper grid. The flattened valleys of each stabilizer wire are vertically displaced beneath and intermediate of the flattened peaks and are secured such as by welding to the flattened valleys of the support wires.

One advantage of this invention is that it enables a bedding foundation having a nestable, stackable spring or wire core or assembly to be made more stable, thereby reducing the sway or movement of the foundation upon being subject to a moving load.

BRIEF DESCRIPTION OF THE DRAWINGS

The objectives and features of the invention will become more readily apparent from the following detailed description taken in conjunction with the accompanying drawings in which.

DETAILED DESCRIPTION OF THE INVENTION

Figure 1:
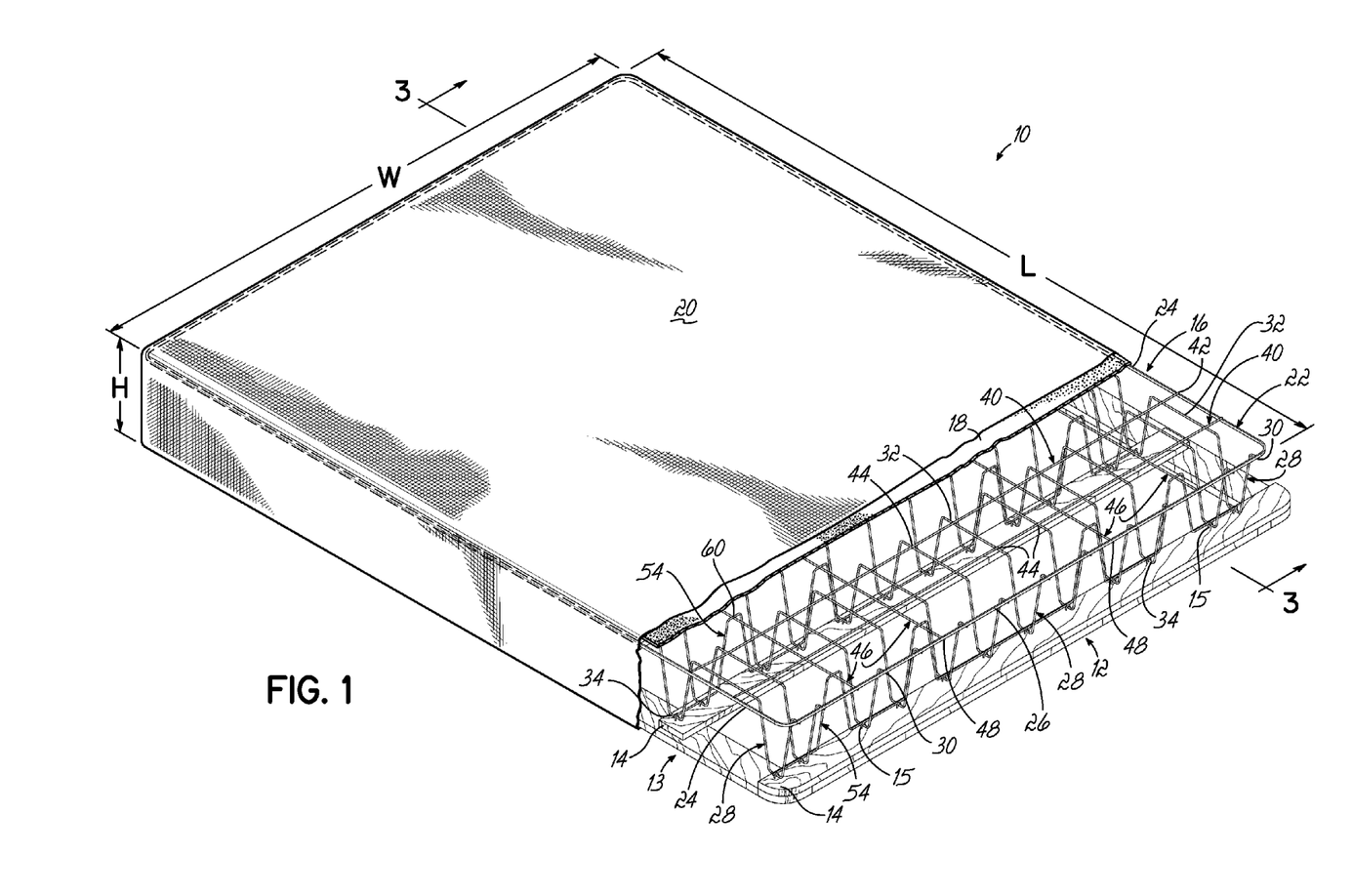
FIG. 1 is a perspective view, partially broken away, of a bedding foundation according to one embodiment of this invention.

Referring first to FIG. 1, a bedding foundation 10, according to one embodiment of this invention, is illustrated. As shown in FIG. 1, the foundation 10 has a longitudinal dimension or length L, a transverse dimension or width W and a height H. Although the length L is shown as being greater than the width W, they may be identical.

Figure 2:
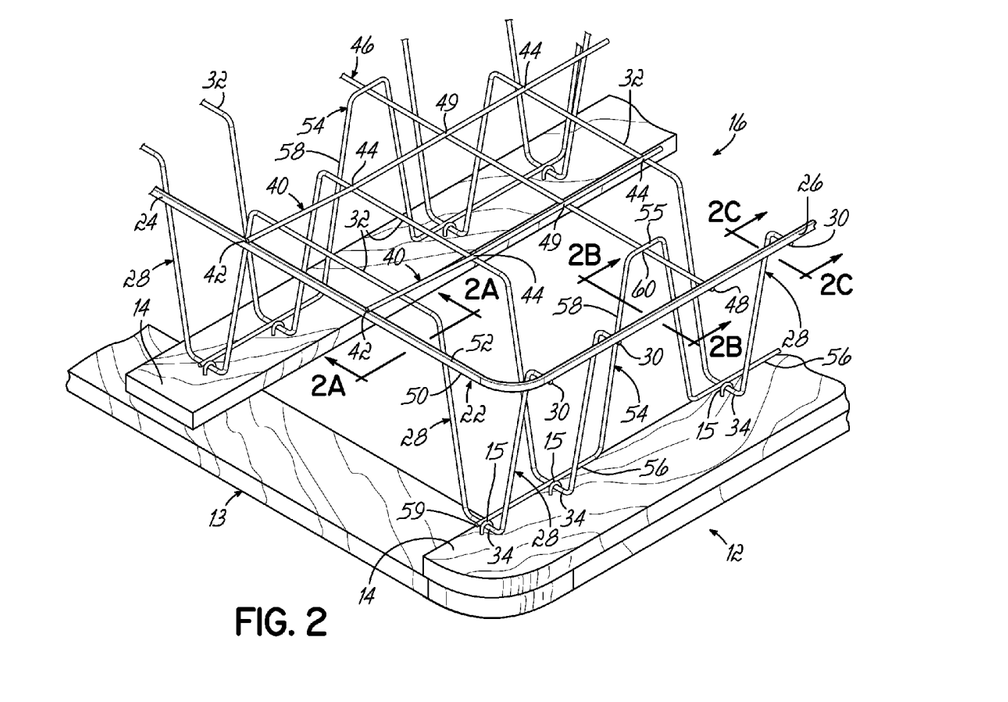
FIG. 2 is an enlarged perspective view illustrating a portion of the foundation of FIG. 1.

The foundation 10 has a base 12, including a rectangular base frame 13 on which transverse slats 14 are attached. A nestably stackable spring assembly or wire core 16 is fixed atop the base 12 and, more particularly, secured to the transverse slats 14 of base 12 with staples 15, as shown in FIG. 2. Padding 18 overlies the nestably stackable spring assembly 16, and a fabric covering 20 overlies the padding 18 and surrounds the nestably stackable spring assembly 16 and the base 12. Although the base 12 is usually made of wood, it may be made of any other material, such as plastic, for example.

The nestably stackable spring assembly 16 includes a generally rectangular steel border wire 22 having two parallel sides 24, 24 and two parallel ends 26, 26 (only one being shown in FIG. 1). The parallel sides 24, 24 are longer than the parallel ends 26, 26 in the embodiment illustrated. However, in a square product, the sides and ends may be the same length. The border wire 22 is illustrated being the border wire disclosed in U.S. Pat. Nos. 8,332,974 and 8,327,475, which are each fully incorporated herein. However, other border wires may be used.

Figure 2C:
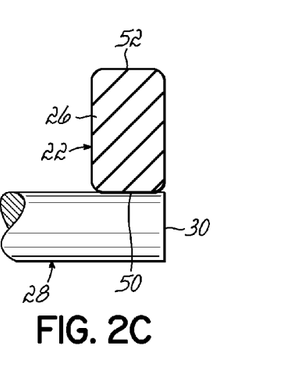
FIG. 2C is a cross-sectional view taken along the line 2C-2C of FIG. 2.
Figure 3:
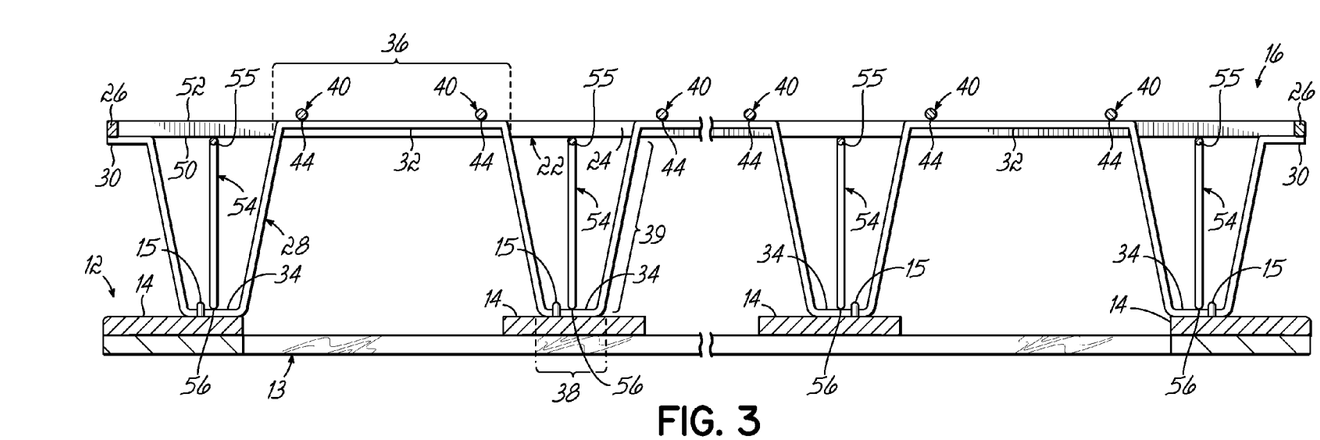
FIG. 3 is a cross-sectional view taken along the line 3-3 of FIG. 1 without padding or a fabric covering.

The nestably stackable spring assembly 16 further comprises transversely spaced, parallel, and longitudinally extending steel support wires 28. These support wires 28 are parallel to the border wire sides 24, 24 and have ends 30 which are welded to the ends 26, 26 of the border wire 22, as shown in FIGS. 2 and 2C. These support wires 28 are formed so as to be generally corrugatedly-shaped along their lengths, having peaks 32 and valleys 34. These peaks 32 and valleys 34 are flattened at their respective distal portions 36 and 38, respectively. See FIG. 3. The adjacent distal portions 36, 38 are joined together by linear connecting portions 39 of the support wire 28. Alternatively, the support wires may be resilient with non-linear arms or connecting portions joining adjacent flattened peaks and flattened valleys. Examples of such support wires are disclosed in U.S. Pat. Nos. 7,805,780 and 7,930,777, which are each fully incorporated herein.

Figure 2A:
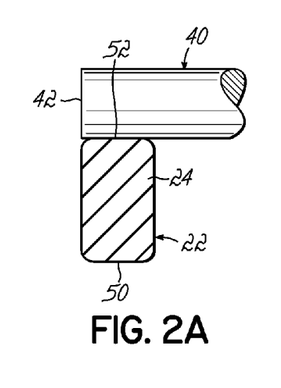
FIG. 2A is a cross-sectional view taken along the line 2A-2A of FIG. 2.

The nestably stackable spring assembly 16 further comprises longitudinally spaced, parallel and transversely extending steel upper connector wires 40 extend parallel to the border wire ends 26, 26 and have ends 42 which are welded to the border wire sides 24, 24, as shown in FIGS. 2 and 2A. As best shown in FIG. 2, these upper connector wires 40 are welded intermediate of their ends 42, 42 along their lengths at intersections 44 to the flattened peaks 32 of the support wires 28.

The support wires 28 have flattened distal peak portions 36 and flattened distal valley portions 38, with the support wire ends 30 being welded to the border wire 22. In this embodiment, two upper connector wires 40 per flattened distal peak portion 36 are illustrated. However, any number of upper connector wires 40 may be secured, i.e., welded to each flattened distal peak portion 36 of each support wire 28. The distal valley portions 38 of the support wires 28 may be stapled or otherwise attached to the transverse slats 14 which are, in turn, affixed to the base frame 13.

As best shown in FIGS. 2 and 2C, an end portion of each of the support wires 28 is welded to a lower surface 50 of the border wire 22 and, more specifically, to the lower surface 50 of one of the ends 26, 26 of the border wire 22.

Figure 2B:
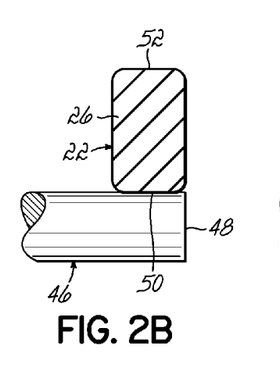
FIG. 2B is a cross-sectional view taken along the line 2B-2B of FIG. 2.

Referring again to FIG. 1, continuous longitudinal wires 46 may be included in the stackable spring assembly 16. These longitudinal wires 46 have their ends 48 welded to the border wire ends 26, 26, as shown in FIG. 2B. These longitudinal wires 46 may be welded or otherwise secured along their lengths to the upper connector wires 40 at locations 49, as best shown in FIG. 2. In the illustrated embodiment, four longitudinal wires 46 per foundation 10 are illustrated. However, any number of longitudinal wires 46 may be incorporated into the foundation.

As best shown in FIG. 2A, an end portion 42 of each of the upper connector wires 40 is welded to a top surface 52 of the border wire 22 and, more specifically, to the top or upper surface 52 of one of the sides 24, 24 of border wire 22.

As best shown in FIG. 2B, an end portion of each of the continuous longitudinal wires 46 is welded to a lower surface 50 of the border wire 22 and, more specifically, to the bottom or lower surface 50 of one of the ends 26, 26 of border wire 22.

The nestably stackable spring assembly 16 further comprises a plurality of spaced and transversely extending stabilizer wires 54 parallel the border wire ends 26. Each of the stabilizer wires 54 comprises a generally corrugatedly-shaped continuous piece of wire having a plurality of flattened peaks 55 and a plurality of flattened valleys 56. Adjacent peaks 55 and valleys 56 are connected by linear connecting portions 58, as in the support wires 28. The flattened peaks 55 of the stabilizer wires 54 pass over the top of the longitudinal wires 46 and are welded or otherwise secured to the longitudinal wires 46 at locations 60. The flattened valleys 56 of the stabilizer wires 52 are vertically displaced beneath and intermediate of the flattened peaks 55. The flattened valleys 56 of the stabilizer wires 54 pass over the tops of the flattened valleys 34 of the support wires 28 and are welded or otherwise secured to the flattened valleys 34 of the support wires 28. In the embodiment shown in FIGS. 1-4, each stabilizer wire 54 has opposed ends 59 located inside a vertical plane defined by the border wire sides 24 so as to not break or create an unwanted opening in the fabric covering 20.

If desired, additional steel end wires (not shown) may be added either before or after the stackable spring assembly 16 has reached its final assembly destination. These end wires have spaced ends which may be crimped around and/or welded to the border wire 22 and the endmost upper connector wire 40, respectively. These end wires provide additional stiffness to the stackable assembly 16 in an edgemost location of the ends of the assembly 16 so as to prevent the end border wires from deflecting and being permanently distorted when a person sits on the end of a bed of which the foundation forms a part. Such steel end wires are shown in U.S. Pat. No. 5,052,064, which is hereby incorporated by reference in its entirety.

The nestably stackable spring assembly 16 of bedding foundation 10 is generally manufactured by a supplier, who then ships it to an assembler. The assembler adds to the spring assembly 16 the wooden base 12, incorporates padding 18, and covers the components with upholstery 20 to make a completed product.

Figure 4:
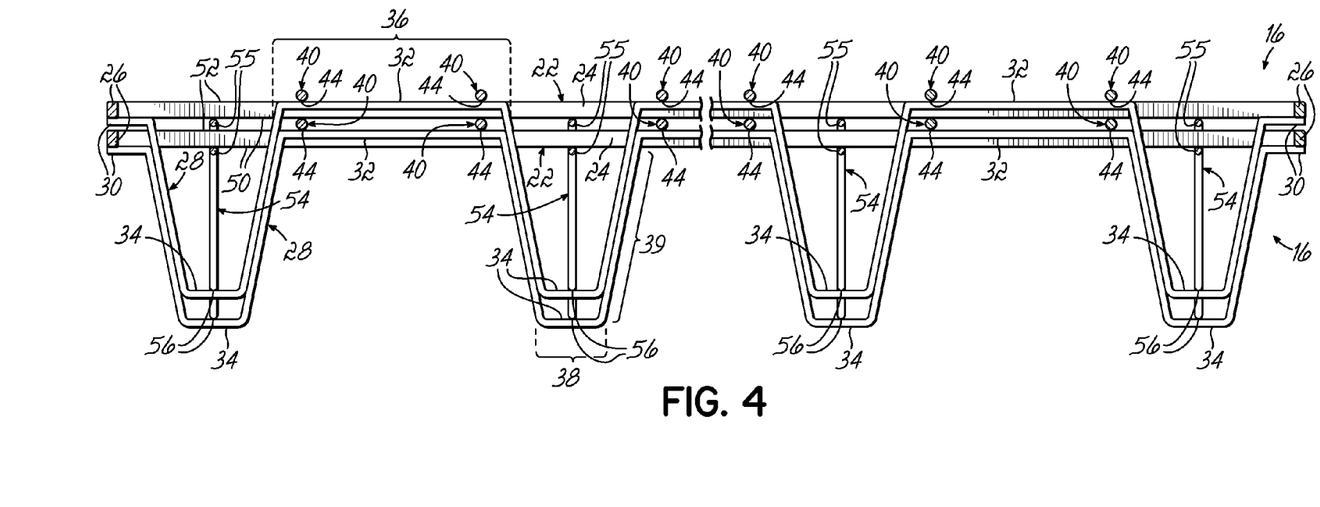
FIG. 4 is a side elevational view of two stacked spring assemblies of the foundation of FIG. 1 without padding or a fabric covering.

This invention facilitates shipment of the metal core or stackable assembly 16 by a supplier to the assembler. With reference to FIG. 4, a first stackable spring assembly 16 may be placed upon a surface with the flattened distal valley portions 38 of the support wires 28 oriented downwardly and the flattened distal peak portions 36 of the support wires 28 oriented upwardly. Next, a second like assembly 16 is placed atop the first assembly 16, with its flattened distal valley portions 38 and flattened distal peak portions 36 likewise oriented downwardly and upwardly, respectively. The flattened distal valley portions 38 of the second assembly 16 are thereby allowed to enter into the voids between the flattened distal peak portions 36 of the first assembly 16. The second assembly 16 nestles downwardly within the first assembly 16 until the outside dimension of the connecting portions 39 of the valleys 34 of the second assembly 16 is equal to the inside dimension of the connecting portions 39 of the valleys 34 of the first assembly 16. At this point, the second assembly 16 comes to nest within the first assembly 16, with the overall height of the nested assemblies 16, 16 substantially less than the sum of the individual heights of the assemblies 16, 16. Of course, any number of assemblies 16 may be nested and stacked together for storage or shipment. Similarly, any number of stabilizer wires 54 may be nested and stacked together for storage or shipment in the same manner.

One advantage of the spring assembly 16 and associated bedding foundation 10, according to this invention, is that the stabilizer wires 54 are uniquely configured to provide the foundation with additional stability. In the embodiment of the bedding foundation 10 and associated spring assembly 16 shown in the drawings, the border wire 22 has a rectangular cross-sectional configuration as disclosed in U.S. Pat. Nos. 8,327,475 and 8,332,974, each one of which is fully incorporated by reference herein. However, this embodiment, and any other embodiment illustrated or described herein, may be used with a border wire having another cross-sectional configuration, such as a round cross-sectional configuration.

Figure 5:
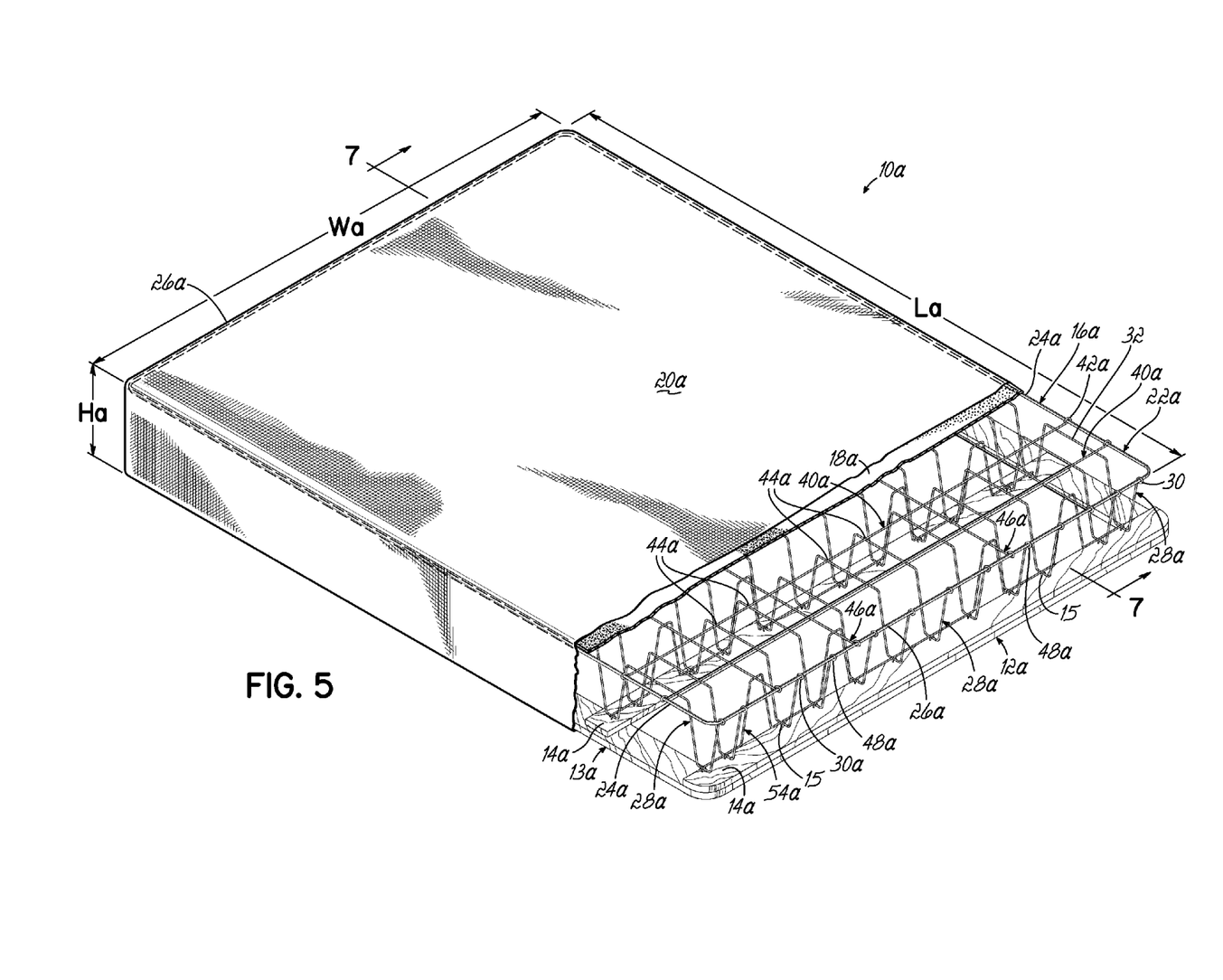
FIG. 5 is a perspective view, partially broken away, of a bedding foundation according to another embodiment.

FIGS. 5-8 illustrate an alternative embodiment of bedding foundation 10a. As shown in FIG. 5, the foundation 10a has a longitudinal dimension or length La, a transverse dimension or width Wa and a height Ha. Although the length La is shown as being greater than the width Wa, they may be identical.

Figure 6:
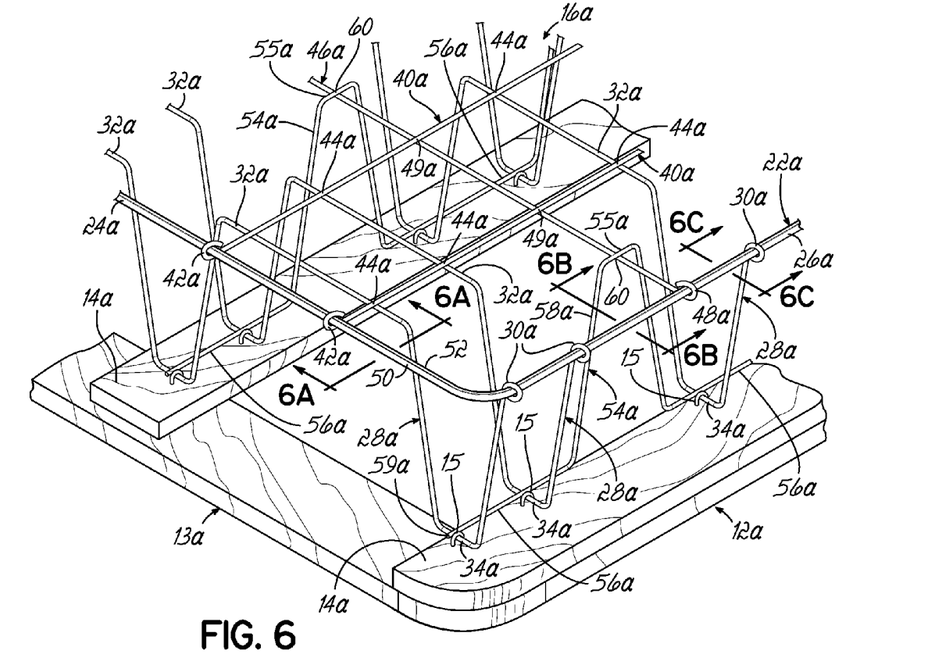
FIG. 6 is an enlarged perspective view illustrating a portion of the foundation of FIG. 5.

The foundation 10a has a base 12a, including a rectangular base frame 13a on which transverse slats 14a are attached. A nestably stackable spring assembly or wire core 16a is fixed atop the base 12a and, more particularly, secured to the transverse slats 14a of base 12a with staples 15, as shown in FIG. 6. Padding 18a overlies the nestably stackable spring assembly 16a, and a fabric covering 20a overlies the padding 18a and surrounds the nestably stackable spring assembly 16a and the base 12a. Although the base 12a is usually made of wood, it may be made of any other material, such as plastic, for example.

The nestably stackable spring assembly 16a includes a generally rectangular steel border wire 22a having two parallel sides 24a, 24a and two parallel ends 26a, 26a. The parallel sides 24a, 24a are longer than the parallel ends 26a, 26a in the embodiment illustrated. However, in a square product, the sides and ends may be the same length. The border wire 22a is illustrated being the border wire disclosed in U.S. Pat. Nos. 8,332,974 and 8,327,475, which are each fully incorporated herein. However, other border wires may be used.

Figures 6A, 6B:
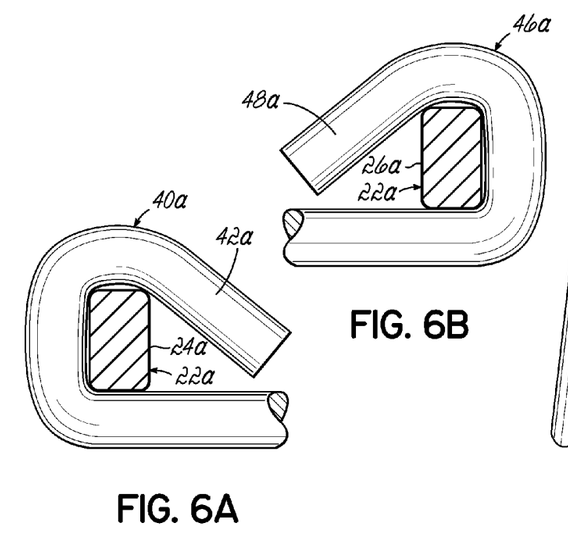
FIG. 6A is a cross-sectional view taken along the line 6A-6A of FIG. 6.
FIG. 6B is a cross-sectional view taken along the line 6B-6B of FIG. 6.
Figure 6C:
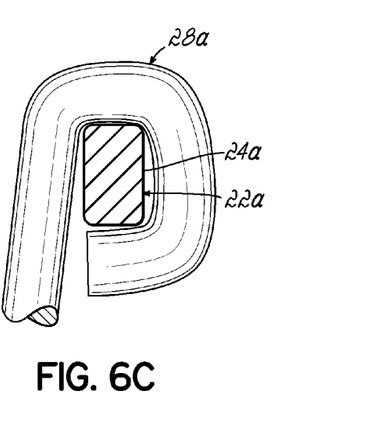
FIG. 6C is a cross-sectional view taken along the line 6C-6C of FIG. 6.

The nestably stackable spring assembly 16a further comprises transversely spaced, parallel, and longitudinally extending steel support wires 28a are parallel to the border wire sides 24a, 24a and have end portions 30a which are crimped or wrapped around the ends 26a, 26a of the border wire 22a, as shown in FIGS. 6 and 6C. These support wires 28a are formed so as to be generally corrugatedly-shaped along their lengths, having flattened peaks 32a and flattened valleys 34a. These peaks 32a and valleys 34a have different lengths 36a and 38a, respectively. See FIG. 7. The lengths 36a, 38a are joined together by linear connecting portions 39a of the support wire 28a. Alternatively, the support wires may be resilient with non-linear arms or connecting portions joining adjacent flattened peaks and flattened valleys. Examples of such support wires are disclosed in U.S. Pat. Nos. 7,805,780 and 7,930,777, each of which is fully incorporated herein.

The nestably stackable spring assembly 16a further comprises a plurality of longitudinally spaced, parallel and transversely extending steel upper connector wires 40a extend parallel to the border wire ends 26a, 26a and have ends 42a which are crimped or wrapped around the border wire sides 24a, 24a. These upper connector wires 40a are welded or otherwise secured intermediate of their ends 42a, 42a along their lengths at intersections 44a to the flattened peaks 32a of the support wires 28a.

In this embodiment, two upper connector wires 40a per flattened peak 36a are illustrated. However, any number of upper connector wires 40a may be secured, i.e., welded to each flattened peak 36a of each support wire 28a. The flattened valleys 38a of the support wires 28a may be stapled using staples 15 or otherwise attached to the transverse slats 14a which are, in turn, affixed to the base frame 13a.

Referring again to FIG. 5, the nestably stackable spring assembly 16a further comprises a plurality of continuous longitudinal wires 46a. These longitudinal wires 46a have their ends 48a crimped or wrapped around the border wire ends 26a, 26a. These longitudinal wires 46a may be welded along their lengths to the upper connector wires 40a at locations 49a, as best shown in FIG. 6. In the illustrated embodiment, four longitudinal wires 46a per foundation 10a are illustrated. However, any number of longitudinal wires 46a may be incorporated into the foundation.

The support wires 28a have support wire end portions 30a being crimped or wrapped around the border wire 22a. FIG. 6A shows one of the upper connector wires 40a passing underneath one of the sides 24a of border wire 22a and having its end 42a wrapped over and around the border wire 22a. FIG. 6B shows one of the longitudinal wires 46a passing underneath one of the ends 26a of border wire 22a and having its end 48a wrapped over and around border wire 22a. Although the drawings show these wires being wrapped a specific direction around the border wire, the wrapping may be in the opposite direction.

The nestably stackable spring assembly 16a further comprises a plurality of spaced and transversely extending stabilizer wires 54a parallel the border wire ends 26a. Each of the stabilizer wires 54a comprises a generally corrugatedly-shaped continuous piece of wire having a plurality of flattened peaks 55a and a plurality of flattened valleys 56a. Adjacent peaks 55a and valleys 56a are connected by linear connecting portions 58a, as in the support wires 28a. The flattened peaks 55a of the stabilizer wires 54a pass over the top of the longitudinal wires 46a and are welded or otherwise secured to the longitudinal wires 46a at locations 60a. The flattened valleys 56a of the stabilizer wires 54a are vertically displaced beneath and intermediate of the flattened peaks 55a. The flattened valleys 56a of the stabilizer wires 54a pass over the tops of the flattened valleys 34a of the support wires 28a and are welded or otherwise secured to the flattened valleys 34a of the support wires 28a. In the embodiment shown in FIGS. 5-8, each stabilizer wire 54a has opposed ends 59a located inside a vertical plane defined by the border wire sides 24a so as to not break or create an unwanted opening in the fabric covering 20a.

If desired, additional steel end wires (not shown) may be added either before or after the stackable spring assembly 16a has reached its final assembly destination. These end wires have spaced ends which are secured to the border wire 22a and the endmost upper connector wire 40a, respectively. These end wires provide additional stiffness to the stackable assembly 16a in an edgemost location of the ends of the assembly 16a so as to prevent the end border wires from deflecting and being permanently distorted when a person sits on the end of a bed of which the foundation forms a part. Such steel end wires are shown in U.S. Pat. No. 5,052,064, which is hereby incorporated by reference in its entirety.

The nestably stackable spring assembly 16a of bedding foundation 10a is generally manufactured by a supplier, who then ships it to an assembler. The assembler adds to the spring assembly 16a the wooden base 12a, incorporates padding 18a, and covers the components with upholstery 20a to make a completed product.

Figure 7:
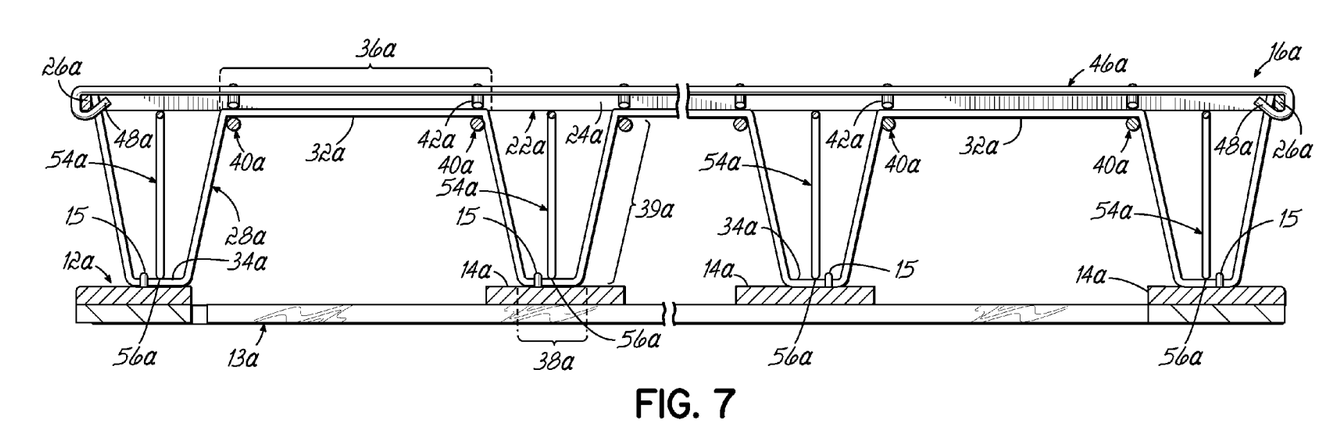
FIG. 7 is a cross-sectional view taken along the line 7-7 of FIG. 5 without padding or a fabric covering.
Figure 8:
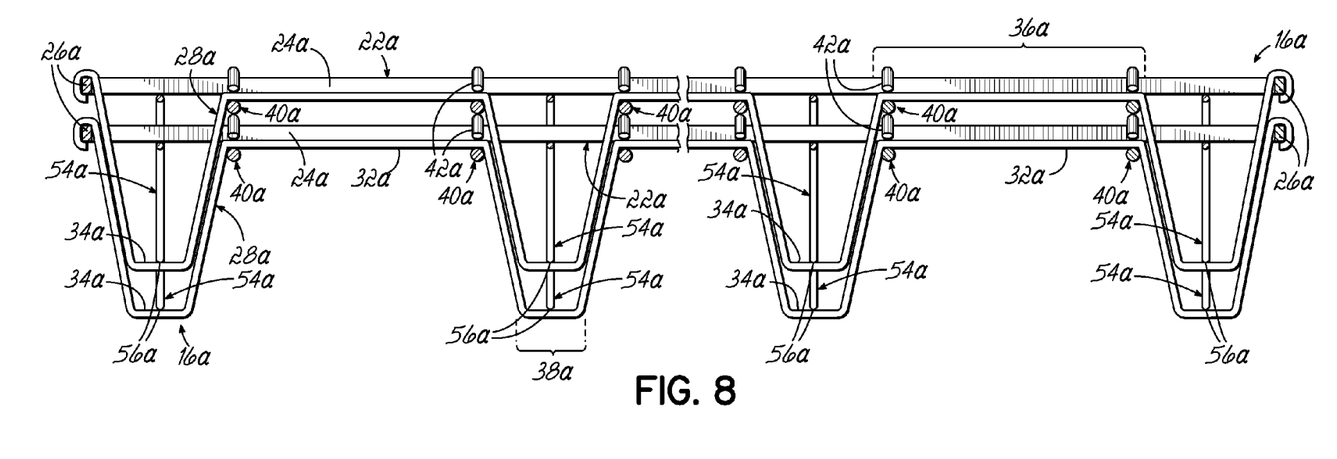
FIG. 8 is a side elevational view of two stacked spring assemblies of the foundation of FIG. 5 without padding or a fabric covering.

This invention facilitates shipment of the metal core or stackable assembly 16a by a supplier to the assembler. With reference to FIG. 7, a first stackable spring assembly 16a may be placed upon a surface with the flattened valleys 38a of the support wires 28a oriented downwardly and the flattened peaks 36a of the support wires 28a oriented upwardly. Next, a second like assembly 16a is placed atop the first assembly 16a, with its flattened valleys 38a and flattened peaks 36a likewise oriented downwardly and upwardly, respectively. The flattened valleys 38a of the second assembly 16a are thereby allowed to enter into the voids between the flattened peaks 36a of the first assembly 16a. The second assembly 16a nestles downwardly within the first assembly 16a until the outside dimension of the connecting portions 39a of the valleys 34a of the second assembly 16a is equal to the inside dimension of the connecting portions 39a of the valleys 34a of the first assembly 16a. At this point, the second assembly 16a comes to nest within the first assembly 16a, with the overall height of the nested assemblies 16a, 16a substantially less than the sum of the individual heights of the assemblies 16a, 16a. Of course, any number of assemblies 16a may be nested and stacked together for storage or shipment.

One advantage of the spring assembly 16a and associated bedding foundation 10a, according to this invention, is that the stabilizer wires 54a are uniquely configured to provide the foundation with additional stability. In the embodiment of the bedding foundation 10a and associated spring assembly 16a shown in the drawings, the border wire 22a has a rectangular cross-sectional configuration as disclosed in U.S. Pat. No. 8,327,475, which is fully incorporated by reference herein. However, this embodiment and any other embodiment illustrated or described herein may be used with a border wire having a round cross-sectional configuration.

Figure 9:
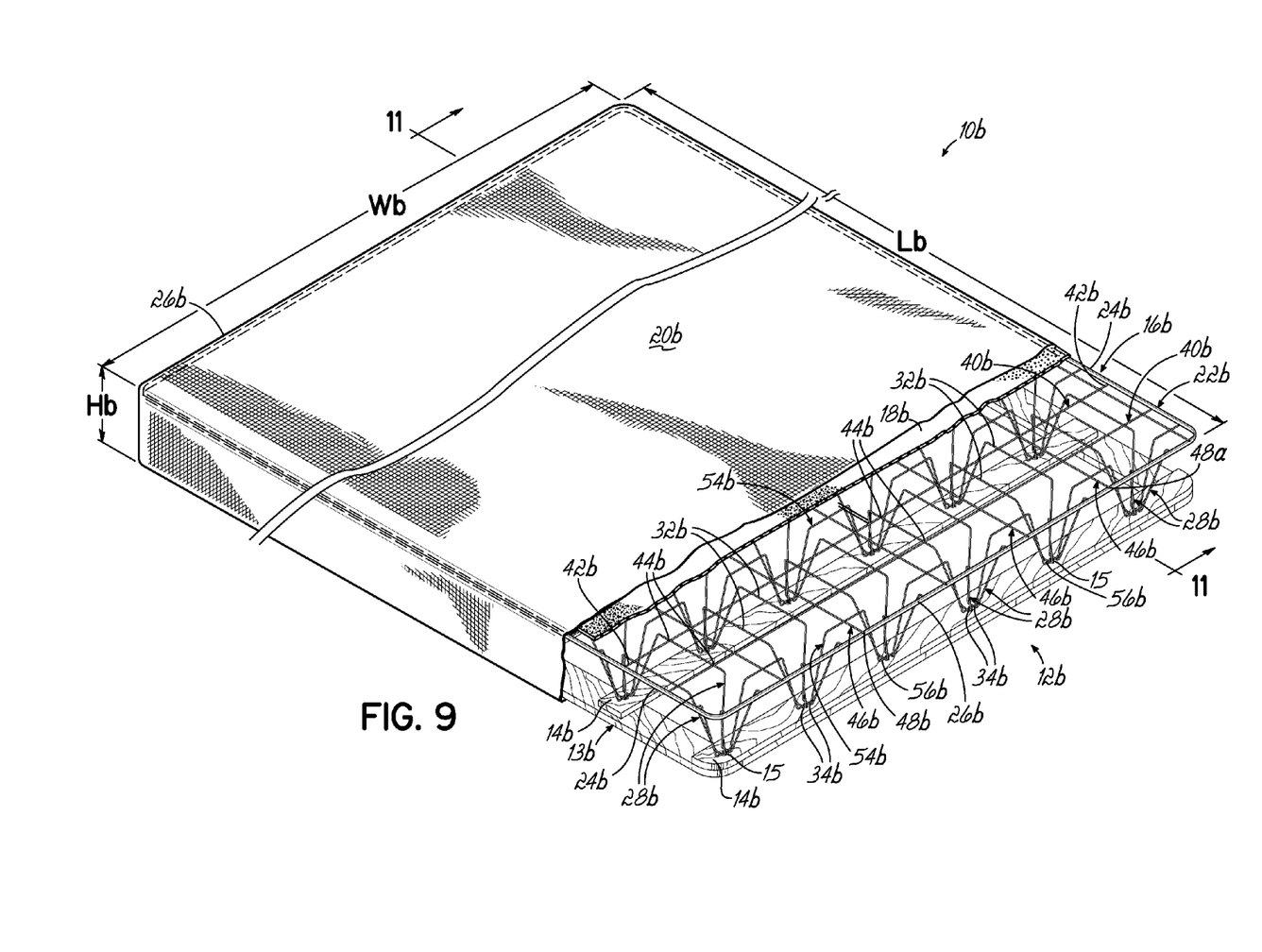
FIG. 9 is a perspective view, partially broken away, of a bedding foundation according to another embodiment.
Figure 10:
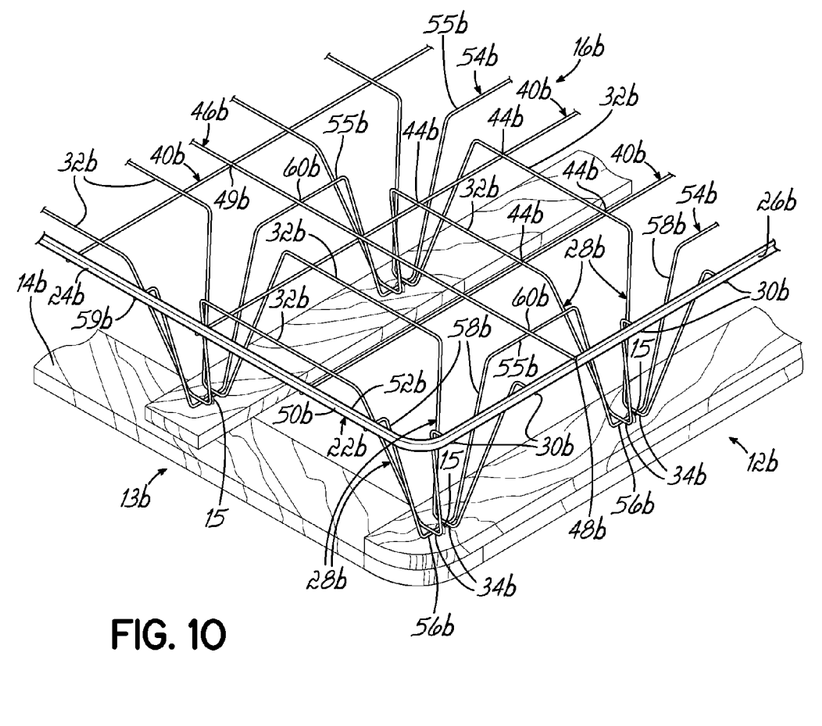
FIG. 10 is an enlarged perspective view illustrating a portion of the foundation of FIG. 9.

FIGS. 9-10 illustrate an alternative embodiment of bedding foundation 10b. As shown in FIG. 9, the foundation 10b has a longitudinal dimension or length Lb, a transverse dimension or width Wb and a height Hb. Although the length Lb is shown as being greater than the width Wb, they may be identical.

The foundation 10b has a base 12b, including a rectangular base frame 13b on which transverse slats 14b are attached. A nestably stackable spring assembly or wire core 16b is fixed atop the base 12b and, more particularly, secured to the transverse slats 14b of base 12b with staples 15, as shown in FIG. 10. Padding 18b overlies the nestably stackable spring assembly 16, and a fabric covering 20b overlies the padding 18b and surrounds the nestably stackable spring assembly 16b and the base 12b. Although the base 12b is usually made of wood, it may be made of any other material, such as plastic, for example.

The nestably stackable spring assembly 16b includes a rectangular steel border wire 22b having two parallel sides 24b, 24b and two parallel ends 26b, 26b (only one being shown in FIG. 9). The parallel sides 24b, 24b are longer than the parallel ends 26b, 26b in the embodiment illustrated. However, in a square product, the sides and ends may be the same length. The border wire 22b is illustrated being the border wire disclosed in U.S. Pat. Nos. 8,332,974 and 8,327, 475, which are each fully incorporated herein. However, other border wires may be used.

Figure 11:
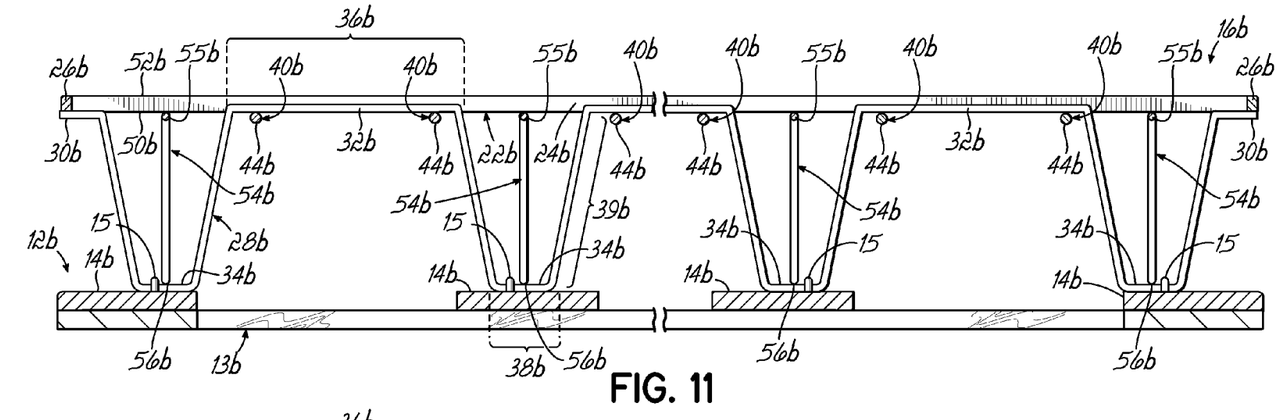
FIG. 11 is a cross-sectional view taken along the line 11-11 of FIG. 9 without padding or a fabric covering.

The nestably stackable spring assembly 16b further comprises transversely spaced, parallel, and longitudinally extending steel support wires 28b. These support wires 28b are formed so as to be generally corrugatedly-shaped along their lengths, having peaks 32b and valleys 34b. These peaks 32b and valleys 34b are flattened at their respective distal portions 36b and 38b, respectively. See FIG. 11. The adjacent distal portions 36b, 38b are joined together by linear connecting portions 39b of the support wire 28b. Alternatively, the support wires may be resilient with non-linear arms or connecting portions joining adjacent flattened peaks and flattened valleys. Examples of such support wires are disclosed in U.S. Pat. Nos. 7,805,780 and 7,930,777, which are fully incorporated herein.

These support wires 28b are not parallel to each other, but instead are angled relative to each other, as best shown in FIG. 10. More specifically, the flattened valleys 34b are closer together than the flattened peaks 32b when the foundation is fully assembled.

The nestably stackable spring assembly 16b further comprises longitudinally spaced, parallel and transversely extending steel upper connector wires 40b extend parallel to the border wire ends 26b, 26b and have ends 42b which are welded to the border wire sides 24b, 24b, as shown in FIG. 10. As best shown in FIG. 10, these upper connector wires 40b are welded intermediate of their ends 42b, 42b along their lengths at intersections 44b to the flattened peaks 32b of the support wires 28b.

The support wires 28b have flattened distal peak portions 36b and flattened distal valley portions 38b, with the support wire ends 30b being welded to the border wire 22b. In this embodiment, two upper connector wires 40b per flattened distal peak portion 36b are illustrated. However, any number of upper connector wires 40b may be secured, i.e., welded to each flattened distal peak portion 36b of each support wire 28b. The distal valley portions 38b of the support wires 28b may be stapled or otherwise attached to the transverse slats 14b which are, in turn, affixed to the base frame 13b.

Referring again to FIG. 9, continuous longitudinal wires 46b may be included in the stackable spring assembly 16b. These longitudinal wires 46b have their ends 48b welded to the border wire ends 26b, 26b, as shown in FIG. 10. These longitudinal wires 46b may be welded or otherwise secured along their lengths to the upper connector wires 40b at locations 49b, as best shown in FIG. 10. In the illustrated embodiment, four longitudinal wires 46b per foundation 10b are illustrated. However, any number of longitudinal wires 46b may be incorporated into the foundation.

Although not illustrated specifically in this embodiment, the support wires 28b, longitudinal wires 46b and upper connector wires 40b are welded to the border wire 22b in the same manner shown in FIGS. 2A-2C and described herein.

The nestably stackable spring assembly 16b further comprises a plurality of spaced and transversely extending stabilizer wires 54b parallel the border wire ends 26b. Each of the stabilizer wires 54b comprises a generally corrugatedly-shaped continuous piece of wire having a plurality of flattened peaks 55b and a plurality of flattened valleys 56b. Adjacent peaks 55b and valleys 56b are connected by linear connecting portions 58b, as in the support wires 28b. The flattened peaks 55b of the stabilizer wires 54b pass over the top of the longitudinal wires 46b and are welded or otherwise secured to the longitudinal wires 46b at locations 60b. The flattened valleys 56b of the stabilizer wires 54b are vertically displaced beneath and intermediate of the flattened peaks 55b. The flattened valleys 56b of the stabilizer wires 54b pass over the tops of the flattened valleys 34b of the support wires 28b and are welded or otherwise secured to the flattened valleys 34b of the support wires 28b. In the embodiment shown in FIGS. 9-10, each stabilizer wire 54b has opposed ends 59b welded to a lower surface of the border wire 22b and specifically one of the border wire sides 24b like the upper connector wires 40b.

If desired, additional steel end wires (not shown) may be added either before or after the stackable spring assembly 16b has reached its final assembly destination. These end wires have spaced ends which may be crimped around and/or welded to the border wire 22b and the endmost upper connector wire 40b, respectively. These end wires provide additional stiffness to the stackable assembly 16b in an edgemost location of the ends of the assembly 16b so as to prevent the end border wires from deflecting and being permanently distorted when a person sits on the end of a bed of which the foundation forms a part. Such steel end wires are shown in U.S. Pat. No. 5,052,064, which is hereby incorporated by reference in its entirety.

The nestably stackable spring assembly 16b of bedding foundation 10b is generally manufactured by a supplier, who then ships it to an assembler. The assembler adds to the spring assembly 16b the wooden base 12b, incorporates padding 18b, and covers the components with upholstery 20b to make a completed product.

This invention facilitates shipment of the metal core or stackable assembly 16b by a supplier to the assembler in the manner described herein with respect to the other embodiments.

Figure 12:
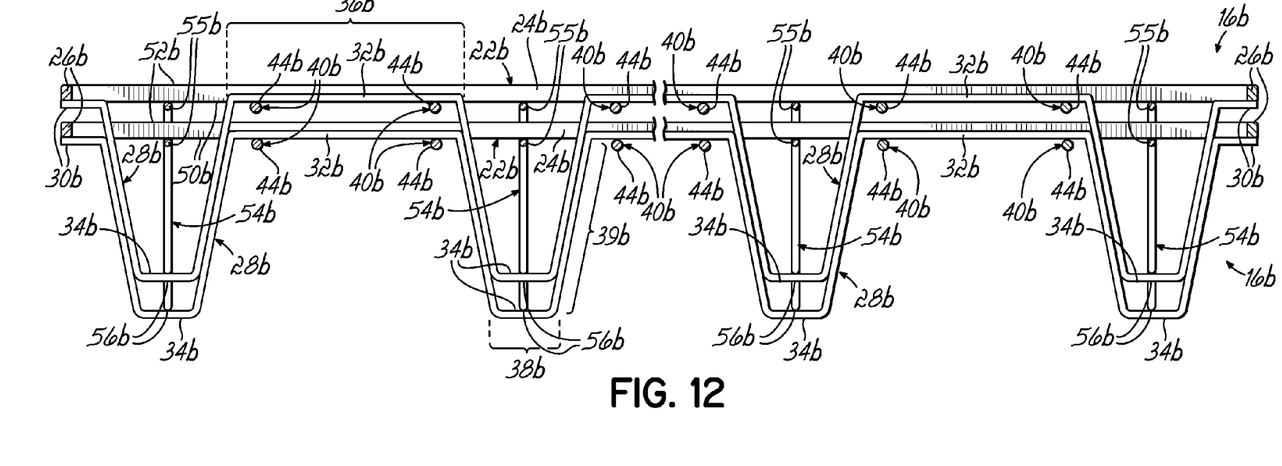
FIG. 12 is a side elevational view of two stacked spring assemblies of the foundation of FIG. 9 without padding or a fabric covering.

This invention facilitates shipment of the metal core or stackable assembly 16b by a supplier to the assembler. With reference to FIG. 12, a first stackable spring assembly 16b may be placed upon a surface with the flattened distal valley portions 38b of the support wires 28b oriented downwardly and the flattened distal peak portions 36b of the support wires 28b oriented upwardly. Next, a second like assembly 16b is placed atop the first assembly 16b, with its flattened distal valley portions 38b and flattened distal peak portions 36b likewise oriented downwardly and upwardly, respectively. The flattened distal valley portions 38b of the second assembly 16b are thereby allowed to enter into the voids between the flattened distal peak portions 36b of the first assembly 16b. The second assembly 16b nestles downwardly within the first assembly 16b until the outside dimension of the connecting portions 39b of the valleys 34b of the second assembly 16b is equal to the inside dimension of the connecting portions 39b of the valleys 34b of the first assembly 16b. At this point, the second assembly 16b comes to nest within the first assembly 16b, with the overall height of the nested assemblies 16b, 16b substantially less than the sum of the individual heights of the assemblies 16b, 16b. Of course, any number of assemblies 16b may be nested and stacked together for storage or shipment. Similarly, any number of stabilizer wires 54b may be nested and stacked together for storage or shipment in the same manner.

One advantage of the spring assembly 16b and associated bedding foundation 10b, according to this invention, is that the stabilizer wires 54b are uniquely configured to provide the foundation with additional stability. In the embodiment of the bedding foundation 10b and associated spring assembly 16b shown in the drawings, the border wire 22b has a rectangular cross-sectional configuration as disclosed in U.S. Pat. Nos. 8,327,475 and 8,332,974, each one of which is fully incorporated by reference herein. However, this embodiment and any other embodiment illustrated or described herein may be used with a border wire having a round cross-sectional configuration.

Figure 13:
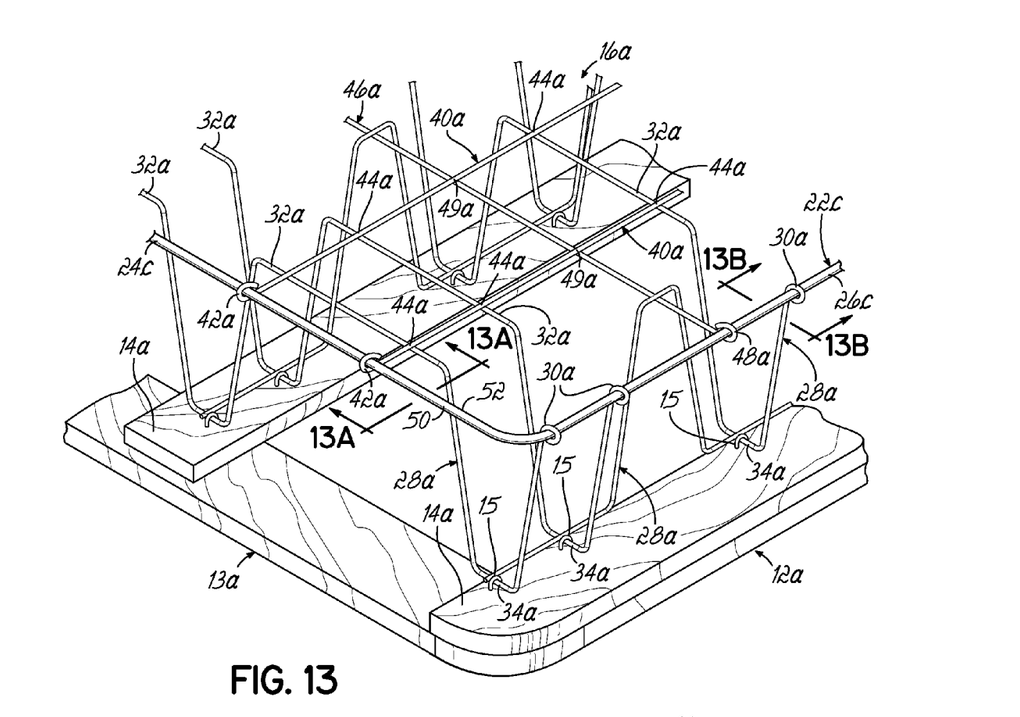
FIG. 13 is an enlarged perspective view illustrating a portion of an alternative embodiment of foundation having a round border wire.
Figure 13A:
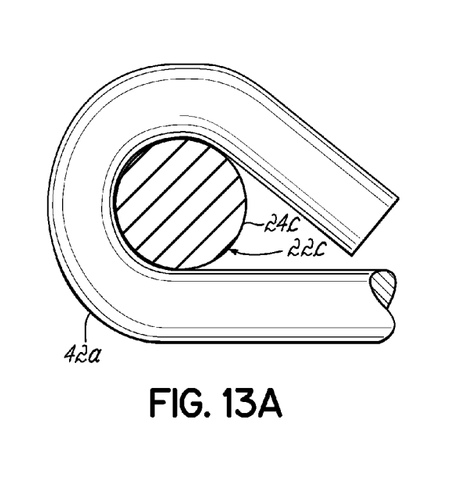
FIG. 13A is a cross-sectional view taken along the line 13A-13A of FIG. 13.
Figure 13B:
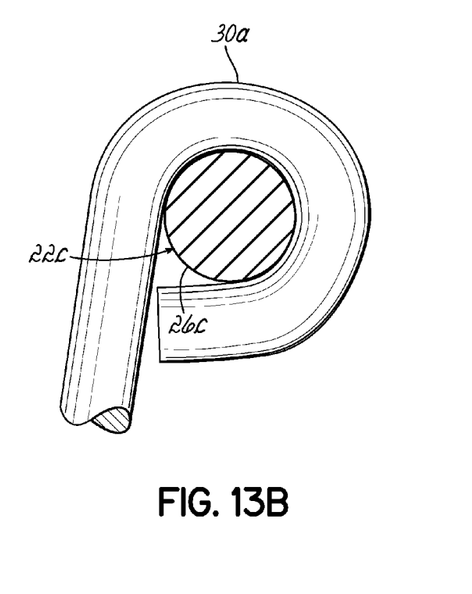
FIG. 13B is a cross-sectional view taken along the line 13B-13B of FIG. 13.

FIGS. 13, 13A and 13B illustrate the embodiment of FIGS. 5-8, but having a border wire 22c having a round cross-sectional configuration. As explained above, any of the embodiments shown or described herein may have a border having a round cross-sectional configuration.

One of ordinary skill in the art will readily recognize that the alternative embodiments of the foundations shown herein are exemplary only of a wide variety of alternative configurations that are readily possible within the scope of this invention.

From the above disclosure of the general principles of the present invention and the preceding detailed description of at least one preferred embodiment, those skilled in the art will readily comprehend the various modifications to which this invention is susceptible. Therefore, we desire to be limited only by the scope of the following claims and equivalents thereof.

We claim:

1. A bedding foundation comprising:
   a rectangular base;
   a spring assembly fixedly attached atop the base;
   padding overlying the spring assembly;
   a fabric covering surrounding the spring assembly, padding and base;
   the spring assembly comprising, a border wire having two parallel sides and two parallel ends defining a perimeter; and a plurality of spaced and longitudinally extending support wires parallel the border wire sides, each of said support wires extending between the border wire ends and being secured thereto, each support wire being a continuous piece of wire having a plurality of flattened peaks and a plurality of flattened valleys, the flattened peaks being generally co-planar with the border wire and the flattened valleys being vertically displaced beneath and intermediate of the flattened peaks;

a plurality of longitudinally spaced, parallel and transversely extending upper connector wires parallel to the border wire ends and having ends secured to the border wire sides, the upper connector wires being connected intermediate of their ends along their lengths thereof to the flattened peaks of the support wires;

a plurality of transversely spaced, parallel and longitudinally extending continuous longitudinal wires parallel to the border wire sides and having ends secured to the border wire ends, the longitudinal wires being connected intermediate of their ends along their lengths thereof to the upper connector wires;

a plurality of spaced and transversely extending stabilizer wires parallel the border wire ends and located between the border wire sides inside the perimeter, each of said stabilizer wires being a continuous piece of wire having a plurality of flattened peaks and a plurality of flattened valleys, the flattened peaks being secured to the longitudinal wires and the flattened valleys being vertically displaced beneath and intermediate of the flattened peaks and being secured to the flattened valleys of the support wires.

2. The bedding foundation of claim 1 wherein the border wire has a generally rectangular cross-sectional configuration.

3. The bedding foundation of claim 1 wherein in each support wire longitudinal voids between flattened peaks are of a dimension greater than the flattened valleys.

4. The bedding foundation of claim 1 wherein the border wire has a cross-section having a height and a width, the height being greater than the width.

5. The bedding foundation of claim 1 wherein each of the stabilizer wires is welded to each of the support wires.

6. The bedding foundation of claim 1 wherein each of the support wires is welded to opposed ends of the border wire.

7. The bedding foundation of claim 1 wherein border wire sides are longer than the border wire ends.

8. The bedding foundation of claim 1 wherein the upper connector wires are welded to the border wire sides and welded to the flattened peaks of the support wires.

9. The bedding foundation of claim 1 wherein ends of the support wires are welded to a lower surface of the border wire ends.

10. The bedding foundation of claim 1 wherein the support wires are generally parallel with each other.

11. A bedding foundation comprising:
a base;
a spring assembly fixedly attached atop the base;
the spring assembly comprising:
a generally rectangular border wire having two parallel sides and two parallel ends; and
a plurality of spaced and longitudinally extending support wires extending between the border wire ends, each support wire having a plurality of flattened peaks and a plurality of flattened valleys, the flattened peaks being generally co-planar with the border wire and flattened valleys being vertically displaced beneath and intermediate of the flattened peaks;

a plurality of transversely spaced, parallel and longitudinally extending continuous longitudinal wires parallel to the border wire sides and having ends secured to the border wire ends, the longitudinal wires being connected intermediate of their ends along their lengths thereof to the upper connector wires;

at least three spaced and transversely extending stabilizer wires parallel the border wire ends, each of the stabilizer wires being a continuous piece of wire having a plurality of flattened peaks and a plurality of flattened valleys, each of the flattened peaks being secured to one of the longitudinal wires and each of the flattened valleys being secured to the flattened valleys of multiple support wires.

12. The bedding foundation of claim 11 further comprising a plurality of longitudinally spaced, parallel and transversely extending upper connector wires parallel to the border wire ends and having ends secured to the border wire sides, the upper connector wires being secured intermediate of their ends along their lengths thereof to the flattened peaks of the support wires.

13. The bedding foundation of claim 11 wherein longitudinal voids between the flattened peaks of each support wire are of a dimension greater than the flattened valleys of the support wire.

14. The bedding foundation of claim 11 wherein the border wire has a generally rectangular cross-sectional configuration.

15. The bedding foundation of claim 11 wherein the foundation has at least two longitudinal wires.

16. The bedding foundation of claim 11 wherein the support wires are welded to the border wire.

17. The bedding foundation of claim 11 wherein border wire sides are longer than the border wire ends.

18. A spring assembly for use in a bedding foundation comprising:
a generally rectangular border wire having two parallel sides and two parallel ends; and
a plurality of spaced and longitudinally extending support wires, each of the support wires being secured to the border wire ends and being located between the border wire sides, each support wire having a plurality of flattened peaks and a plurality of flattened valleys, the flattened peaks being generally co-planar with the border wire and flattened valleys being vertically displaced beneath and intermediate of the flattened peaks;

a plurality of transversely spaced, parallel and longitudinally extending continuous longitudinal wires parallel to the border wire sides and having ends secured to the border wire ends, the longitudinal wires being connected intermediate of their ends along their lengths thereof to the upper connector wires;

at least three spaced and transversely extending stabilizer wires parallel the border wire ends, each of the stabilizer wires being a continuous piece of wire having a plurality of flattened peaks and a plurality of flattened valleys, each of the flattened peaks being secured to one of the longitudinal wires and each of the flattened valleys being secured to the flattened valleys of multiple support wires.

19. The spring assembly of claim 18 further comprising:
a plurality of longitudinally spaced, parallel and transversely extending upper connector wires parallel to the border wire ends and having ends secured to the border wire sides, the upper connector wires being secured intermediate of their ends along their lengths thereof to the flattened peaks of the support wires.

20. The spring assembly of claim 18 wherein the border wire has a generally rectangular cross-sectional configuration.

21. The bedding foundation of claim 18 wherein longitudinal voids between the flattened peaks of each support wire are of a dimension greater than the flattened valleys of the support wire.

22. The spring assembly of claim 21 being a first assembly, which, when placed atop a second assembly of like construction, is nestedly stacked thereon when the flattened valleys of the first assembly enter into the voids between the flattened peaks of the second assembly, the nested assemblies having a total height dimension less than a sum of a height dimension of the first assembly plus a height dimension of the second assembly.

23. The spring assembly of claim 19 wherein the border wire sides are longer than the border wire ends.

* * * * *